Nov. 18, 1958  W. R. WORKS ET AL  2,860,597
MEANS FOR FILLING CAVITY DEFECTS IN PANEL SURFACES
Filed May 3, 1954  5 Sheets-Sheet 1
FIG—1
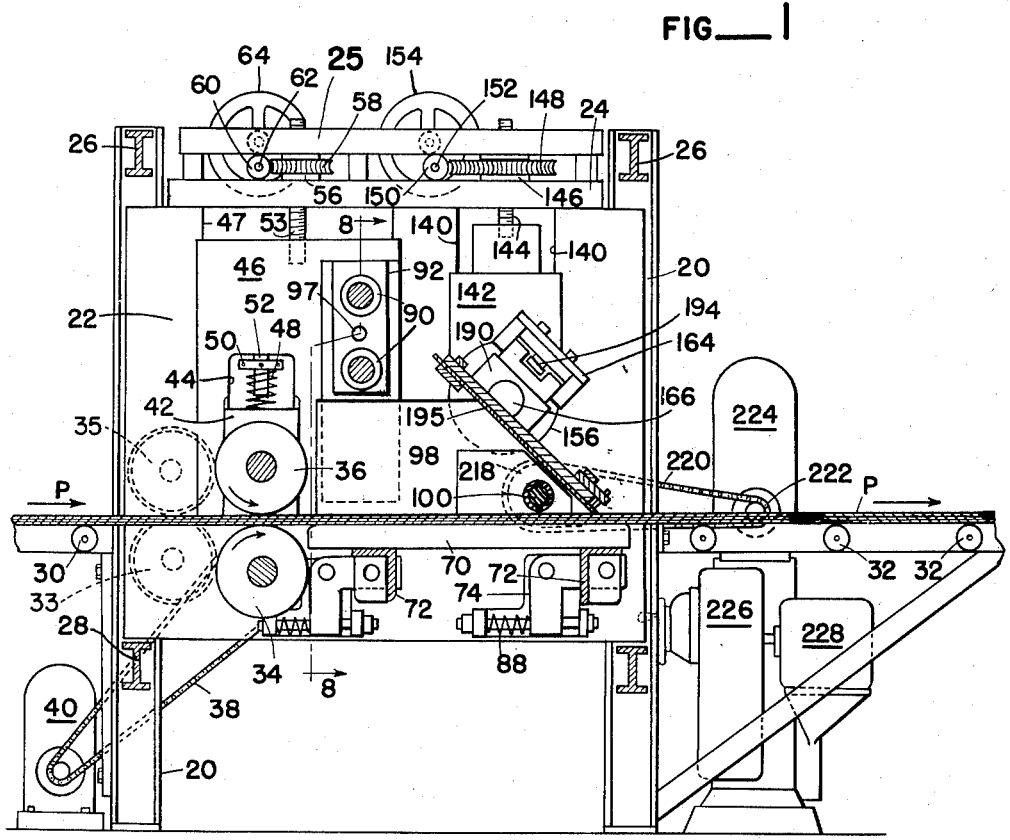
FIG—16
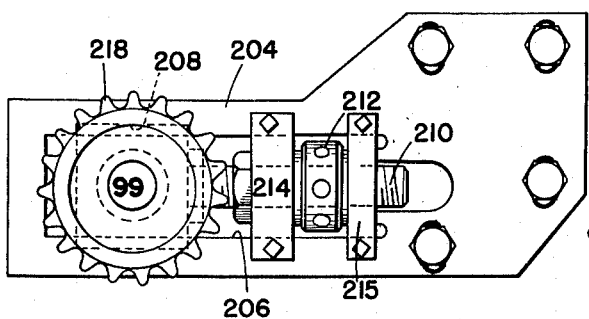
JOSEPH C. BERNEY &
WILLIAM R. WORKS
INVENTORS
BY *Smith + Tuck*
Attys.

Nov. 18, 1958 W. R. WORKS ET AL 2,860,597
MEANS FOR FILLING CAVITY DEFECTS IN PANEL SURFACES
Filed May 3, 1954 5 Sheets-Sheet 2

JOSEPH C. BERNEY &
WILLIAM R. WORKS
*INVENTORS*

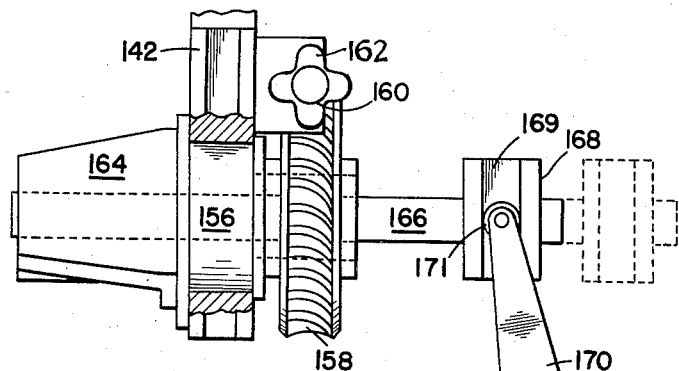
FIG_4
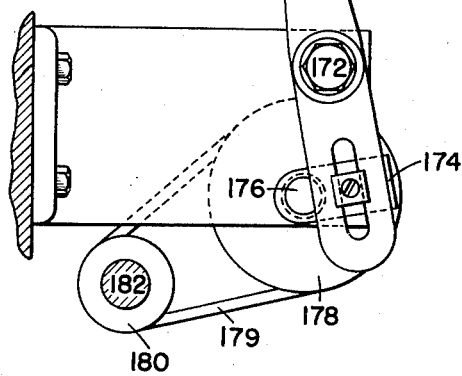
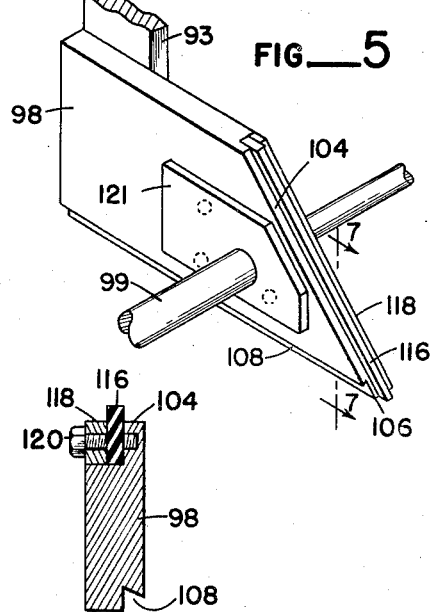
FIG_5
FIG_7
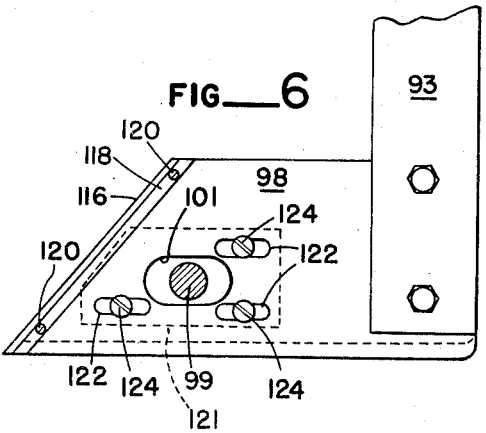
FIG_6
JOSEPH C. BERNEY &
WILLIAM R. WORKS
*INVENTORS*
BY *Smith & Tuck*
  *Attys.*

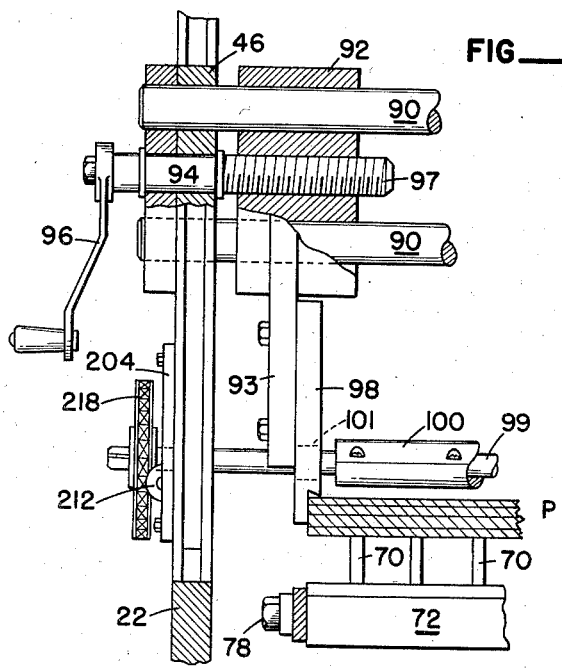
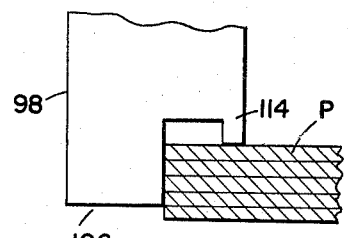
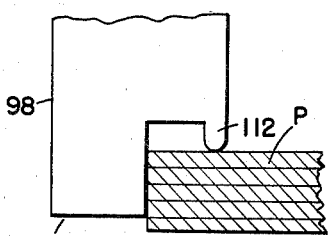
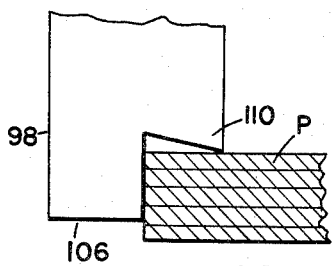
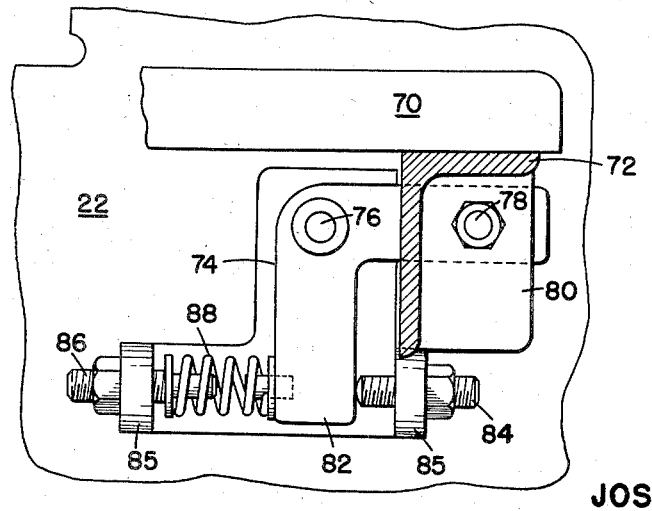

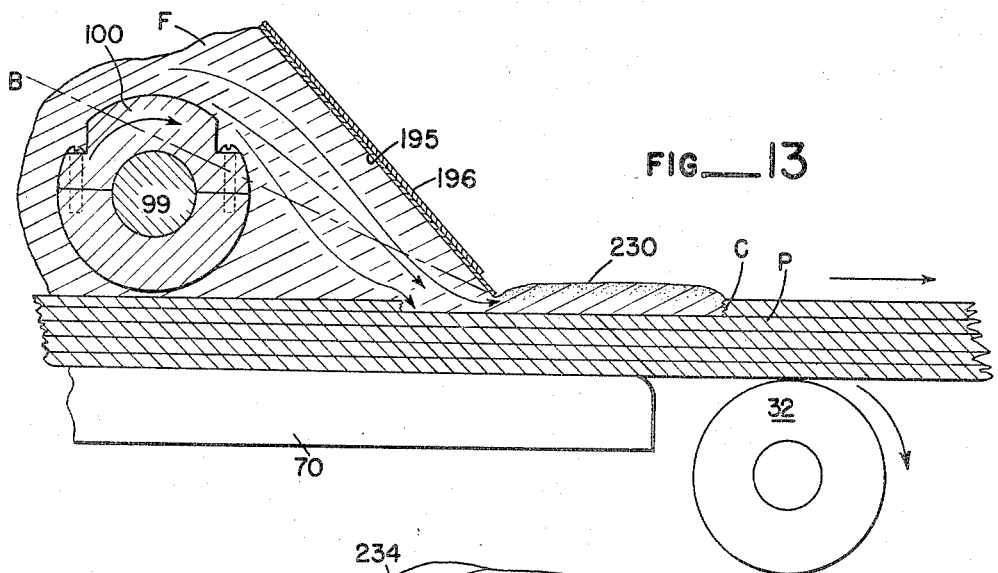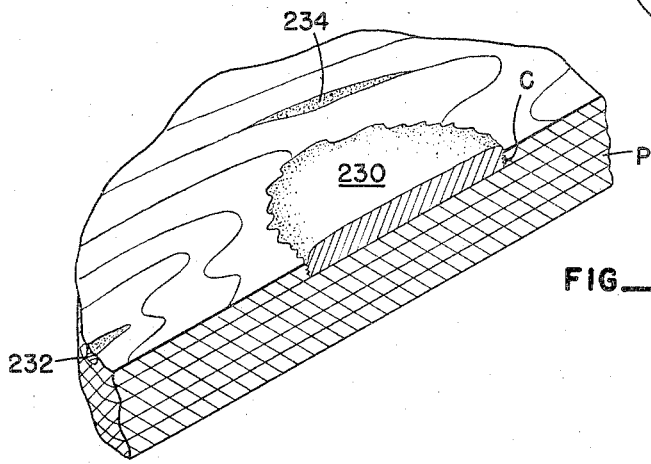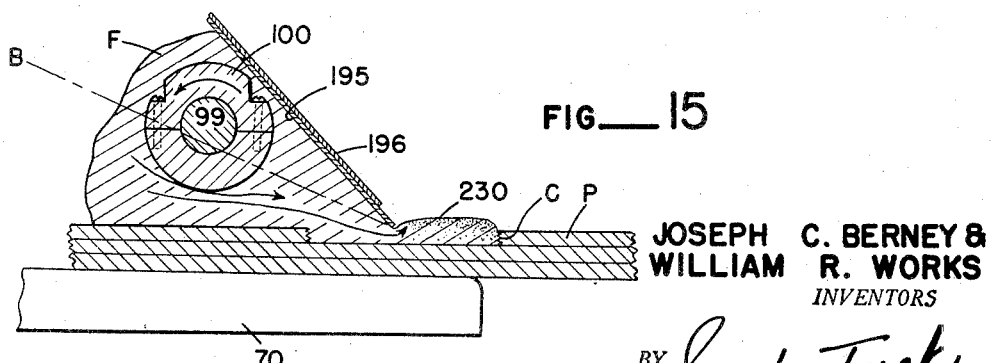

United States Patent Office 2,860,597
Patented Nov. 18, 1958

2,860,597

MEANS FOR FILLING CAVITY DEFECTS IN PANEL SURFACES

William R. Works, Camas, Wash., and Joseph C. Berney, Beaverton, Oreg., assignors of fifty percent to Crown-Zellerbach Corporation, San Francisco, Calif., a corporation of Nevada, and fifty percent to United States Plywood Corporation, New York, N. Y., a corporation of New York Application May 3, 1954, Serial No. 427,073

9 Claims. (Cl. 118—413)

This invention relates to a means for filling cavity defects in panel surfaces and, more particularly, is applicable to treating the surfaces of plywood panels for filling and finishing the same to a uniformly flat condition.

The background of this invention lies in conditions that have come about in the lumbering field involving panel production and panel conversion. Wood panel production, with particular reference to plywood manufacture, has become an industry that is more and more confined by the deficiency and depletion of quality timber from which to cut veneers. This industry must now practice every economy possible if it is to retain present and capture new markets. In the past it has been not unusual to slice or peel wood veneer and use only those pieces which are free of defects and to reject and scrap everything with the slightest defect whether caused, singly or in combination, by a cavity or poor grain formation or bad color. As time has passed the high quality, huge peeler logs have become more and more scarce to such an extent that it is a rare mill that does not have substantial production of veneer that is characterized by having numerous knots, knotholes, voids from injuries, or broken away portions. Good business practices dictate the necessity that every effort be made to convert such lower grades of veneer into useful panels. To do so requires that, at least, the panel surfaces be free of surface cavities and depressions. It is among the paramount objects of this invention to provide a means for accomplishing surface filling of such panels in a manner adapted to line-production, without recourse to the use of manual labor, and in a manner that delays in the smooth flow of production are avoided.

Panel conversion is another field in which this invention finds its necessity. During recent years, exceptionally fine resin-containing overlaying papers, and thin, hard decorative overlays have been produced for lamination to the relatively more stable, structurally strong, and suitable plywood panels. Because of the thinness of the surface films, papers and decorative overlays which are to be applied, it is imperative that the plywood base be free of surface cavity defects so that the overlaid material will lie, in its finished position, in a flat plane, unmarred by the slightest defect which would, of course, be very apparent when viewed from a flat angle. Thus, another object of the invention has been the provision of a means of filling and leveling plywood panel surfaces with a material that eliminates minute as well as substantial voids and which may be, along with the surface veneers, sanded or surfaced to extreme flatness.

Additional objects of the invention reside in providing a mechanism for placing filling material in plywood cavity defects which operates entirely across a panel face throughout its length and adapted to be included in a conventional panel production line; that requires, once it has been placed in operation, little more than periodic supervision to insure an appropriate feed of material to be worked upon and a supply of filler material for the surfacing operation; that will handle heavy, viscous, plastic filler materials in a continuous manner; that will insure, at the moment of filling, an application of substantial pressure upon the filler material so that the cavity filling is slightly in excess of the volume of the void to thus produce a slight "overfilling" that may subsequently be sanded with the panel to a level surface; that avoids air entrapment in the filling material which would expose voids upon surface sanding and present a problem as serious as the one sought to be overcome; and a mechanism that is simple to construct, operate, and maintain with relatively unskilled labor and supervision while at the same time producing a highly satisfactory product.

These and other objects of this invention will be apparent during the course of the following specification in which is set forth the preferred form of the invention and, in certain instances, modifications and changes which are likewise useful. It will, of course, occur to those skilled in the pertinent art that the specific embodiments of the invention here shown may be changed and altered without departing from the basic concepts and structures set forth. It is our every intention to cover those changes and alterations which come within the spirit and scope of the invention as defined by the subjoined claims.

Figure 1 is a vertical section view of the apparatus for filling cavity defects in plywood panels;

Figure 4 is a view showing the mechanism by which the doctor blade is reciprocated during the cavity filling operation;

Figure 5 is a perspective view of the inner face of an edge dam and a portion of the pump roll shaft of our cavity filling apparatus;

Figure 6 is a view in elevation of the outer face of an edge dam;

Figure 7 is a vertical sectional view of the nose end of an edge dam taken in the plane indicated by lines 7—7 of Figure 5;

Figure 8 is an elevation view on line 8—8 of Figure 1 of the rear of an edge dam showing its lateral adjusting means, portions being sectioned or omitted for convenience of illustration;

Figure 9 is an enlarged detail view, with portions broken away and omitted, of the resilient supporting means for the work table immediately underlying the pressurized zone where cavity filling takes place;

Figure 10 is an enlarged detail view showing the cooperative arrangement provided between the workpiece-panel and the lower portion of an edge dam;

Figures 11 and 12 illustrate alternate forms of edge dam constructions at the point of contact with the workpiece-panel;

Figure 13 is an enlarged detail view illustrating the cavity filling operation and the pressuring effect of a pump roll in the apparatus;

Figure 14 is an enlarged, fragmentary, perspective view, with portions shown in section, of typical filled cavities resulting from this invention;

Figure 15 is a detailed schematic view of an alternate apparatus arrangement showing a filling operation similar to that shown in Figure 13; and Figure 16 is an end view of the adjustable journal means for supporting the pump roll and its drive element.

For the purposes of this disclosure of the invention, it appears preferable to describe the method, and apparatus which practices the method, applied to the typical situation encountered in the plywood industry. It will, of course, be understood that it is considered within the scope of the invention to apply the same, merely by the exercise of normal mechanical skill, to related board and other woody panel fields having similar problems.

There have been developed viscous patching materials, which, under the application of pressure through a knifing element having its edge passing over the surface of the plywood around the periphery of a cavity, will enter the cavity and fill the same. Under the unique conditions and cooperative mechanisms disclosed here it is possible to "over-fill" the cavity so that, after subsequent curing, the cavity filling can be sanded to the level of the panel surface without undue sacrifice of the panel body.

In essence, panels are supported with the face to be filled directed upward and a body of the viscous patching material is placed thereon. A doctor knife, having its lower edge riding upon the panel surface to sweep the panel, presses upon the patching material and causes the same to enter all cavities. Since the doctor blade spans the cavities and since the patching material, by means more fully disclosed hereafter, is under elevated pressure some of the patching material will rise above the cavity rim, as it moves away from the doctor blade, to create an "overfilling." In such an arrangement, the panels and doctor blade have relative movement to each other whereby the wiping and forcing action on the filler material is enhanced. Normally such relative movement is accomplished by advancing the panels past the doctor blade.

The frame and panel feed

Figure 2:
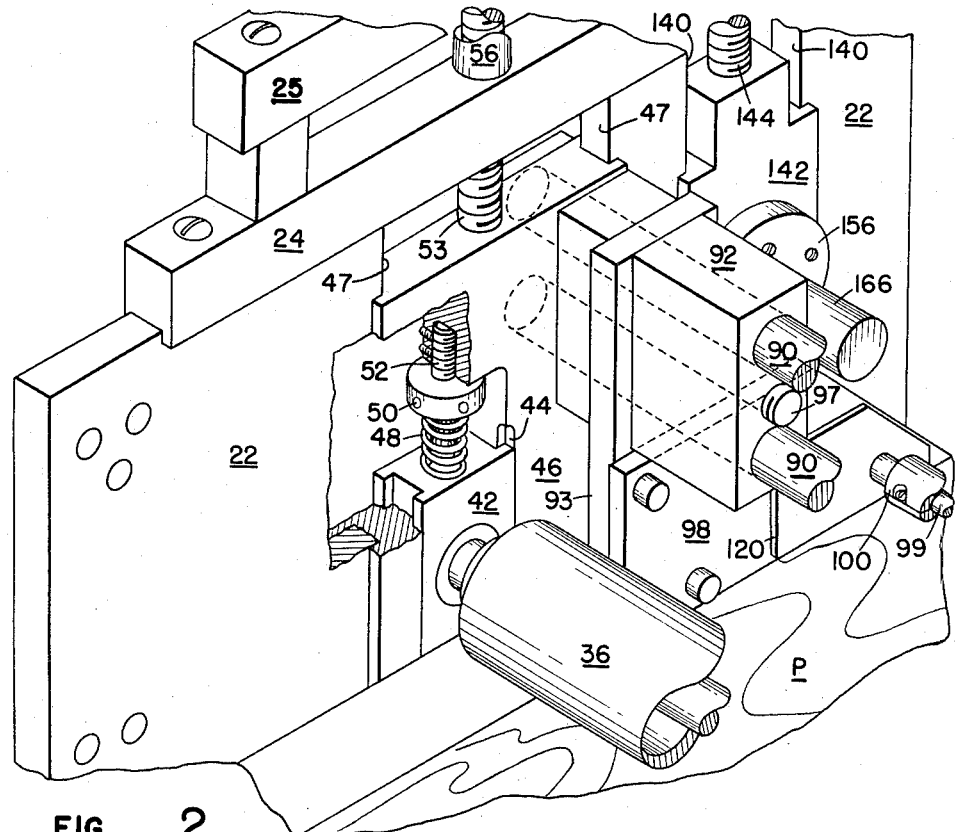
Figure 2 is an enlarged, fragmentary perspective view of the mounting means for feed rolls, edge dam, and doctor blade provided at one end of a pressure zone in the machine of Figure 1.
Figure 3:
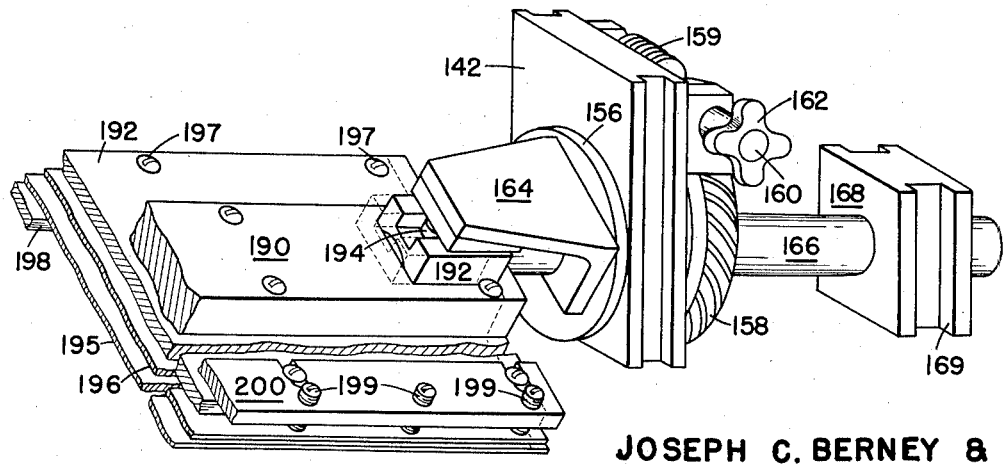
Figure 3 is a fragmentary perspective view of an end portion of a doctor blade and its mounting and reciprocating means.

Referring to Figures 1 and 2 of the drawings, the cavity filling mechanism includes upright frame legs 20 which, in pairs, are joined by a main frame plate 22 and cross header 24. A pair of legs 20, plate 22, and header 24 comprise a frame-end that is disposed alongside one of the longitudinal edges of panel P. A similar frame is positioned along the opposite edge of panel P in opposition to the first described frame and the two are joined by transverse beams 26 and 28 in the upper and lower areas of the framework. Plywood, or other woody panels, are delivered to the filling machine by a conveyor system involving rollers 30, and are conveyed away by a conveyor system including rollers 32 to the left and to the right respectively in Figure 1. The movement of the panels to and from the patching machine may be by gravity, by driven rolls, or other means conventional in the industry.

Movement of the panel through the patching machine, however, it best accomplished by a pressure drive involving lower drive roller 34, disposed beneath panel P, and the superposed resiliently mounted driven roller 36 above panel P. The ends of the drive roller 34 are journaled in the opposed frame plates 22 and, by means of a sprocket on the shaft of roller 34, power is applied thereto through the drive chain 38, which is activated by the power unit 40. Power is supplied to driven roller 36 by means of intermediate drive gears 33 and 35 mounted between suitable gears on rollers 34 and 36 respectively.

Each end of pressure roller 36 is mounted in a journal block 42 which is adapted for sliding movement in a slot 44 of slide plate 46. Screw shaft 52 extends downward from plate 46 and has nut 50 thereon. Between the upper surface of block 42 and the nut 50 is mounted spring 48. By turning the adjusting nut 50 on shaft 52, more or less compression of spring 48 may be obtained resulting in a subsequent increase or decrease of the resilient pressure applied to roll 36. Panel P is pinched between rollers 34 and 36 and is thus fed with force through the machine.

Plate 46 is slidably mounted in guide ways 47 of plate 22. Upstanding threaded stud 53 rises from the plate 46 and passes through the nut 56 which includes worm pinion gear 58. Nut 56 is mounted between the header 24 and supplemental header 25. A worm 60 is keyed to shaft 62 and meshes with gear 58. This worm is turned by hand wheel 64 through intermeshed gears and rotation of the latter produces a turning of the pinion gear 58 and nut 56 which results in raising or lowering the slidable plate 46 and the pressure roll 36 carried thereby.

The work table

To the rear of the drive roll 34, in the direction of the travel of panel P, is a work table for supporting the panel during the cavity-filling operation. This table comprises upstanding bars 70 arranged longitudinally of the panel and in spaced apart relation to each other. The bar ends are secured to transverse beams 72. As can best be seen in Figure 9, each corner of the work table is coupled to a bell crank 74. Pins 78 pass through plates 80 in the ends of the cross beams. The bell cranks are pivoted on pins 76 supported by plate 22. The depending arms 82 of the bell cranks 74 may be swung longitudinally of the machine to raise or lower the table surface. This is accomplished through manipulation of the adjusting screws 84 and 86, as shown in Figure 9. Also a variation of the resilience and action of spring 88 on arm 82 is obtainable through relatively more or less compression being applied by relative adjustment of the screws 84 and 86 with respect to each other. Screws 84 and 86 are mounted in outstanding ears 85 mounted on the frame plate 22.

The edge dam

Figures 1, 2 and 8 of the drawings show that the slide plate 46 carries a pair of traverse rods 90 in vertical spaced-apart relation. Lateral slide block 92 is guidedly movable on said rods. Screw 94, journaled in plate 46 and turned by a crank 96, has its other end 97 threadedly engaged in block 92. The latter is caused to move away from or approach plate 46 by rotation of screw 94. Block 92 has a depending arm 93 and an edge dam 98 as shown in Figure 5 attached to the lower end of the arm. An edge dam is provided for each side edge of the panel P and each dam is adjustably movable lateral of the machine on the transverse rods 90—90 in the manner that has been described.

A pair of edge dams 98, each located at opposite edges of the panel being patched, serves to confine the viscous patching material to the pressure zone (more fully described hereinafter) and prevent it from over-flowing the edges of the panel. Each edge dam 98 has a slot 101 to pass the pump roll shaft 99. The pump roll 100 on shaft 99 is preferably located near the lower portion of the edge dams and adjacent their trailing pointed ends. The preferable form of the edge dam includes a sloping or angular surface 104, which converges with the bottom edge 106 at an acute angle.

In order to obtain a sealing joinder between the lower edge 106 of the edge dam and the panel being processed in this machine, the edge dam has rabbet 108. As shown in Figure 10, rabbet 108 forms a line-contact joint with panel P. Line contact between the arris face of the edge dam and the panel P is variously obtained by the overhanging lips 110, 112 and 114, respectively, of the several Figures 10, 11 and 12. The overhanging relation of such lips permits rather substantial line contact between the edge dam 98 and the plywood panel P, but with a reduction of contact pressure on the edge of the panel. It will be seen that the flange 106 of the edge dam depends below the upper surface of the panel along an edge. This edge contact upon the panel keeps the panel in line with edge dam and may prevent escape of patching material.

The inclined trailing edge 104 of the edge dam is provided with a flexible or resilient sealing blade 116 held in place by clamp bar 118 and bolts 120. Blade 116 serves in a manner more fully described later, to seal the point of contact between the edge dam and a doctor blade used in the machine.

The pump roll

Pump roll shaft 99 passes through the elongated and vertically enlarged aperture 101 in each edge dam. A sealing plate 121, juxtaposed to the inner surface of the edge dams, covers aperture 101 to prevent the escape of the patching compound. Slots 122 and screws 124, passing therethrough, lock the sealing plate 121 in its adjusted position as may be determined by the location of shaft 99 which is adjustable relative the edge dams.

Pump roll 100 is formed of matched, semi-cylindrical portions clamped to the pump roll shaft 99 as shown in Figures 8, 13 and 15. In an alternative arrangement these portions may be secured directly to the pump roll shaft 99 by any other suitable means.

Referring to Figure 16 of the drawings, a bracket arm 204, provided on each end frame of the machine is secured to the slide plates 46 near the discharge end of the machine. The arms extend rearwardly from their point of attachment to a position underlying the doctor blade 195 for the purpose of locating the pump roll under the doctor blade 195.

Each arm 204 has a slot 206 which slidably receives a bearing block 208 that may move longitudinally in the slot through the action of screw 210 which extends from the bearing block 208 and, nut 212 thereon. The screw passes through rigid ears 214 and 215 between which is located nut 212. Rotation of the nut results in movement of the bearing block 208 in the well known manner and thus shaft 99 is shifted forward or rearward as desired. Arms 204 are slotted at their point of attachment to plates 46 which permits upward or downward adjustment of the location of the axis of shaft 99.

Sprocket 218 is keyed to shaft 99 and, by means of drive chain 220, a couple is obtained with drive sprocket 222 of the drive mechanism 224 which is suitably powered. Pump roll 100 secured to the shaft 99 is revolved over the upper surface of panel P in the body of the filling and patching compound employed in the operation.

The doctor blade

Referring again to Figure 1, it will be seen that plate 22 is additionally slotted or parted to provide opposed slideways 140 in which block 142 is slidably mounted for vertical movement. An upstanding screw stud 144, connected to the block 142, is associated with nut 146 that is coupled to pinion gear 148. Worm 150 on shaft 152 is turned through suitable gearing by the hand wheel 154 and revolves gear 148. Manipulation of the hand wheel 154 results in raising or lowering block 142 and the apparatus carried by said block.

Sleeve 156, shown in Figure 4, is journaled in the block 142 for rotation, the latter being accomplished by means of worm gear 158 secured to the sleeve and worm 159 on shaft 160 which has attached thereto hand wheel 162. Rotation of hand wheel 162 results in a turning or rocking effect on worm gear 158 and a consequent rotation of the sleeve 156 in block 142.

On the inner end of sleeve 156 is mounted L-shaped bracket 164. A reciprocal shaft 166 passes through sleeve 156 and has its inner end disposed under bracket 164 while its outer end, at a position outside of the frame of the machine, is secured to the reciprocator block 168. Shaft 166 is reciprocated by the bifurcated rock lever 170 (see Figure 4) pivoted at 172 and actuated by crank 174 on shaft 176. Power is supplied to sheave 178 by belt 179 from drive sheave 180 through drive shaft 182 from the power source 226 and 228. The rock lever 170 straddles and has sliding contact with block 168 through rollers 171 in grooves 169 on opposite sides of the block.

The inner end of shaft 166 is secured, as by welding, to a cross beam 190 that forms the backbone for the doctor blade construction. Beam 190 extends transversely across the machine and has a trunnion shaft (not shown) on its opposite end suitably journalled in the machine frame for longitudinal, sliding movement. Beam 190 carries grooved block 192 in which guide roller 194, supported by the bracket 164, is placed. By this arrangement, a guiding movement of beam 190 is permitted but the effect of the bracket is such as to prevent changes in the angular disposition of beam 190 except when sleeve 156 is rocked or revolved.

The doctor blade mechanism, in addition to beam 190, also includes main plate 192 and relatively thin steel blades 195 and 196 superposed to each other and appropriately secured at their upper edges by screws 197 between plate 192 and clamping bar 198.

At their lower edges, the flexible blades 195 and 196 extend beyond the lower edge of plate 192. An overhanging adjustably mounted bar 200, slidably secured to plate 192, supports a series of adjusting screws 199, which bear upon the free edges of the flexible plates 195 and 196. Since screws 199 are numerous and relatively closely spaced along the free edge of blades 195 and 196, it will be seen that a fine adjustment can be made in the backing support or pressure on the flexible blades and that their free edges can be caused to conform to a panel surface.

Rotation of the doctor blade mounting means, by manipulation of hand wheel 162, results in the under surface of the doctor blade being pressed tightly to the sealing blades 116 of the sloping faces 104 of the edge dams. Thus the doctor blade has a wiping contact with the edge dams so that, during reciprocation of the blades, escape of the patching material at this point is prevented. Of course, swinging of the doctor blade in the direction away from contact with the edge dams opens up the area under the doctor blade for removal of patching material, as when operation of the machine is terminated for any extended period of time, or the compound is to be changed.

It will be understood that the contact edges of the flexible blades 195 and 196 have a wiping contact with the surface of a panel P at an angle thereto. They also reciprocate transverse the panel surface as it moves in a straight line through the machine. Patching material is, in this manner, pressed into cavity defects but wiped off the panel face around such cavities.

Method of operation

The work-piece panels P are fed continuously to the machine shown in Figure 1 from the left and are discharged from the machine to the right of the view. Since considerable friction between the doctor blade and panel is involved in the filling of cavities and voids and in the spreading of the patching material over the surface of the board, the panels are force-fed through the operation of the fed rolls 34 and 36 which securely grip and force the panel forward through the machine.

A quantity of viscous cavity-filling material F is placed in the V-shaped zone defined by the upper surface of the panel P, the under face of the doctor blade 195 and between the end-confining edge dams 98. In this zone, substantial pressure is produced upon and within the filler F through the action of the pump roll and the movement of the panel P.

The filling action is alternately illustrated in Figures 13 and 14 and in Figure 15. Pump roll 100 is revolved about its axis, the latter being disposed transverse of the direction of travel of the work piece panel P, in a direction that the surface of the pump roll which is closest to the adjacent panel surface travels counter to the direction of travel of the panel surface. Because of this manner of rotating the pump roll 100, and due to the substantial viscosity of the filler material, an elevated pressure is obtained upon and within the filler material in the V-shaped pressure zone. Thus, when filler material escapes from the pressure zone into a cavity C in a panel, it passes under the lowermost tip of the doctor blades 195, 196 and rises slightly in the manner shown in Figure 13 which is an illustration of an "over-filling" of a cavity C.

It will be noted in Figure 13, in which is shown the actual form of a preferred mechanism, that the axis of the pump roll does not coincide with the bisector B of the angle between the doctor blade and the panel surface. In effect, the pump roll 100 is positioned longitudinally of the pressure zone to one side of bisector B so that it imparts an inward force upon the viscous patching material that is disposed between the pump roll surface and the doctor blade. In this instance, the latter surface is the more remote wall of the pressure zone.

In Figure 15, an alternative arrangement is shown wherein the axis of the pump roll 100, also unsymmetrically positioned with respect to bisector B, is closer to the doctor blade than it is to the panel surface, so that the pump roll is located closely adjacent the under surface of the doctor blade. In this instance the panel surface is the more remote wall of the pressure zone. In this alternative arrangement, the rotation of the pump roll is opposite that described in connection with Figure 13 in order that the desired elevated pressure upon and in the filler material F is upon that which underlies the pump roll 100.

The forces of friction and the driving action of the pump roll appears to work on the mass of material disposed between the pump roll and the more remote wall of the pressure zone, in this case, the upper surface of the work-piece panel P. In Figure 15 an over-filling of a cavity C is likewise shown.

It will be understood that not only are the relatively large cavities C filled, as has been described, but the patching and filling material is spread substantially evenly over the entire upper surface of the panel and even the most minute cavity defects are corrected. The excess material is wiped off of the surface by the doctor blade edges.

During the cavity filling operation that has been described, the doctor blade is constantly reciprocating laterally of the panel P so that its contact edge is traveling back and forth across the panel. Because the panel surface is moving this reciprocation provides a diagonal shearing effect between the filler material being deposited in cavities and that which is being retained behind the doctor blade. The result is that the filler material is cleanly and smoothly cut away from the mass from which it is being drawn. This action, together with the "over-filling" action, results in a cavity having filler material fully deposited therein to practically fill all of the cavity recesses and edges, irrespective of shape or size.

While it has been described herein that the ideal operating conditions of this cavity filling machine include movement of the panel surface relative the doctor blade, rotation of the pump roll in a certain manner relative the more remote wall of the pressure zone in which the pump roll is placed, and reciprocation of the doctor blade transversely of the moving panel face, it will be understood that experience teaches that, on occasion, satisfactory results are obtained, without reciprocation of the doctor blade. In other instances, rotation of the pump roll may be dispensed with.

In Figure 14, where a fragment of a repaired plywood panel is shown in perspective with portions cut away for convenience of illustration, the repair filling 230 is typical of that obtained by the arrangement of Figure 13. It will be noted that the upper surface of the cavity filling assumes the form of a meniscus that lies slightly above the surface of panel P. Since all cavity defects are cured at one time, a more minute cavity repair 232, as indicated, is typical of the smaller cavities that sometimes result from wood failure during the peeling operation or from the veneer being bumped or struck in handling. Occasionally, also, a void occurs in the wood face along the line of demarcation between the hard summer and softer spring wood. To illustrate such, filling 234 is also shown in Figure 14.

Occasionally splinters of wood may either ride with a panel surface or may break off the veneer around the periphery of a cavity. Normally they tend to move to the point of contact of the doctor blade with the panel surface. The reciprocation of the doctor blade quickly works the splinters and small wood particles out from under the doctor blade and away. In this way, any deflection of the edge of the doctor blade is eliminated quickly and cleanly so that undue amounts of the filler material F are not wastefully deposited on the panel surface.

Experience teaches that very satisfactory cavity filling of plywood surfaces is had with a patching compound having a viscosity of about one million cps. where the relative movement of the plywood to the doctor blade was at a rate of ten to twelve feet per minute. During such operations the doctor blade was set at an acute angle of 45° to the surface of the plywood and was oscillated at 4–5 cycles per second in an amplitude of about three-fourths of an inch. The preferable pump roll diameter is about two and one-eighth inches and the pump roll operates well turning at approximately 100 R. P. M. It is believed that the patching material can have viscosities up to about two million cps. but the viscosity should not be too low, so that after the cavity has been filled, the patching material will remain in place. The doctor blade angle may vary from about 25° to 75° to the surface of the plywood and its frequency of oscillation in the range of two to twelve cycles per second can vary inversely to amplitudes of oscillation of from zero to four inches. The plywood-doctor blade relative movement can be as slow as eight feet per second and as great as twenty-six feet per second. Operation of the pump roll also permits fairly wide latitude within the range from 40 to 200 R. P. M.

Ordinarily panel surfaces that have been filled in the machine operations described are passed to suitable curing devices which may take the form of ovens or of banks of intra-red heat lamps wherein the binder materials within the cavity fillings are set into an infusible and insoluble state. Thereafter, by using conventional sanding equipment, the panel surfaces are levelled and smoothed whereupon they may be painted, or as is more preferable, overlaid with resin-containing overlaying papers or thin and hard decorative overlays.

From a reading of the foregoing it will be apparent that a method apart from the specific function of the mechanism is disclosed and described which accomplishes the adequate filling and "over-filling" of cavity defects in woody panel faces with a viscous patching material. In essence this method involves obtaining relative movement between the surface of the panel face P having cavity defects to be filled and a knifing or doctoring element, which may be a broad knife, adjacent an inclined face of which is positioned a quantity of the filling material F. Under such conditions of relative movement the method includes creating an elevated pressure upon the body F of filling material adjacent the doctor element so that not only is the patching material forced into a cavity but, due to the elevated pressure created within the body of filling material, material is permitted to escape through the cavity to the other side of the doctor element and produce the over-filling of the cavity which is apparent by the rise in the filling above the edges of the cavity and the panel surface, as shown in Figures 13, 14 and 15. The creation of the elevated pressure within the body of filling material, adjacent the doctor element may be obtained, in addition to the manner disclosed herein involving the use of a pump roll 100, through the use, manually, of a simple presser or pusher tool that constantly applies pressure upon the body F in excess of that required to insure close disposition of the same adjacent the point where the filling operation takes place. In other words, at the point of contact between the doctor element and the panel surface P, with respect to which relative movement is obtained, there is created an elevated pressure. Thus, by simple tools, the nature of which will be readily apparent to anyone skilled in this art, a very unusual and extremely useful and satisfactory filling of cavity defects in wood panels is obtained.

Having thus described our invention, we claim:

1. A mechanism for filling cavity defects in the face of a woody panel with a hardenable viscous patching material, comprising: means for supporting a panel with the face to be filled directed upward; a doctor blade extending entirely across said panel and inclined at an acute angle relative the panel and having a lower edge presented contiguous to the face of the panel; upright edge dam means fitted closely to the ends of the blade and to the edges of the panel on the acute angular side of the blade to form therewith a pressure zone for patching material ahead of the blade; means to obtain relative horizontal movement between said panel face and said doctor blade at right angles to the disposition of the blade whereby cavity defects are filled by said patching material in said pressure zone which leads said blade and the lower edge of said blade has a leveling action on the deposited patching material substantially flush with the remainder of the panel face at the location of the blade; and a rotatable pump roll in said pressure zone having its axis oriented longitudinally of said pressure zone and unsymmetrical relative the median of the angle formed by the blade and the panel face and drive means operative to rotate said pump roll in a direction to impart an inward force upon the patching material disposed between the roll and the more remote wall of the pressure zone.

2. A mechanism for filling cavity defects in the face of a woody panel with a hardenable viscous patching material, comprising: means for supporting and means for advancing a panel to be filled in a substantially horizontal path with the face to be filled directed upward; a doctor blade extending entirely across said panel and inclined at an acute angle relative the panel on the leading side of the blade and having a lower edge presented contiguous to the face of the panel; upright edge dam means fitted closely to the ends of the blade and to the edges of the panel on the acute angular side of the blade to form therewith a pressure zone for patching material ahead of the blade; a rotatable pump roll in said pressure zone having its axis oriented longitudinally of said pressure zone and unsymmetrical relative the median of the angle formed by the blade and the panel face and drive means operative to rotate said pump roll in a direction to impart an inward force upon the patching material disposed between the roll and the more remote wall of the pressure zone; and means to obtain reciprocal movement of said doctor blade across said panel face.

3. A mechanism for filling cavity defects in the face of a woody panel with a hardenable viscous patching material, comprising: means for supporting a panel with the face to be filled directed upward; a doctor blade extending entirely across said panel and inclined at an acute angle relative the panel and having a lower edge presented contiguous to the face of the panel; upright edge dam means fitted closely to the ends of the blade and to the edges of the panel on the acute angular side of the blade to form therewith a pressure zone for patching material ahead of the blade; means to obtain relative horizontal movement between said panel face and said doctor blade at right angles to the disposition of the blade whereby cavity defects are filled by said patching material in said pressure zone which leads said blade and the lower edge of said blade has a leveling action on the deposited patching material substantially flush with the remainder of the panel face at the location of the blade; a rotatable pump roll in said pressure zone having its axis oriented longitudinally of said pressure zone and unsymmetrical relative the median of the angle formed by the blade and the panel face and drive means operative to rotate said pump roll in a direction to impart an inward force upon the patching material disposed between the roll and the more remote wall of the pressure zone; and means to reciprocate said doctor blade across said panel face.

4. A mechanism for filling cavity defects in the face of a woody panel with a hardenable viscous patching material, comprising: means for supporting a panel with the face to be filled directed upward; a doctor blade extending entirely across said panel and inclined at an acute angle relative the panel and having a lower edge presented contiguous to the face of the panel; upright edge dam means fitted closely to the ends of the blade and to the edges of the panel on the acute angular side of the blade to form therewith a pressure zone for patching material ahead of the blade; means to obtain relative horizontal movement between said panel face and said doctor blade at right angles to the disposition of the blade whereby cavity defects are filled by said patching material in said pressure zone which leads said blade and the lower edge of said blade has a leveling action on the deposited patching material substantially flush with the remainder of the panel face at the location of the blade; and a rotatable pump roll in said pressure zone having its axis oriented longitudinally of said pressure zone and close to the panel face unsymmetrical relative the median of the angle formed by the blade and the panel face and drive means operative to rotate said pump roll in a direction to impart an inward force upon the patching material disposed between the roll and the doctor blade.

5. The subject matter of claim 4 in which the doctor blade is mounted for rceiprocation across the panel face and means is included to reciprocate the doctor blade during relative movement between said doctor blade and the panel surface.

6. A mechanism for filling cavity defects in woody panel faces with a hardenable viscous patching material, comprising: driven roll means for advancing panels in a substantially horizontal path with the face to be filled directed upward; resilient work table means adjacent said roll means for supporting said panel to be filled; a doctor blade extending entirely across said panel inclined at an acute angle thereto in the direction of advance of said panel with its lower edge contiguous the face of said panel; upright edge dam means adjacent the end of said blade and closely fitted thereto and to the edges of the panel face to form therewith a pressure zone for patching material ahead of the blade; said doctor blade and edge dam means being disposed toward said resilient work table means in such manner that the latter is tensed to a degree to insure a tight contact between the edge dam means and the doctor blade and the face to be filled; a rotatable pump roll unsymmetrically positioned longitudinally in said pressure zone and transversely of the direction of panel travel to impart an inward force upon the patching material disposed between said roll surface and the more remote longitudinal wall of said pressure zone; and means for rotating said pump roll; the advancement of said panel relative said doctor blade in the presence of a quantity of patching material under the effect of the pump roll serving to spread said patching material substantially evenly over the upper surface of said panel as it leaves the pressure zone and the excess of said patching material after the cavity defects have been filled being wiped off said surface of the panel by said doctor blade.

7. The structure according to claim 6 wherein means is included to reciprocate said doctor blade across the panel face while maintaining its edge in contact with the panel surface to be filled.

8. A mechanism for filling cavity defects in the face of a woody panel with a hardenable viscous patching material, comprising: means for supporting a panel with the face to be filled directed upward; a doctor blade extending entirely across said panel and inclined at an acute angle relative the panel and having a lower edge presented contiguous to the face of the panel; upright edge dam means fitted closely to the ends of the blade and to the edges of the panel on the acute angular side of the blade to form therewith a pressure zone for patching material ahead of the blade; means to obtain relative horizontal movement between said panel face and said doctor blade at right angles to the disposition of the blade whereby cavity defects are filled by said patching material in said pressure zone which leads said blade and the lower edge of said blade has a leveling and wiping action on the deposited patching material substantially flush with the remainder of the panel face at the location of the blade; and a rotatable pump roll in said pressure zone having its axis oriented longitudinally of said pressure zone and located closely adjacent the under surface of said blade and unsymmetrical relative the median of the angle formed by the blade and the panel face and drive means operative to rotate said pump roll in a direction to impart an inward force upon the patching material disposed between the roll and the panel face.

9. A mechanism for filling cavity defects in the face of a woody panel with a hardenable viscous patching material, comprising: resilient means for supporting said panel with the face to be filled directed generally upward; a doctor blade extending crosswise of said panel and having a lower edge presented contiguous to the face of the panel; edge dam means fitted closely to the ends of the blade and bearing on the upper face edges of the panel to form with the panel face a broad pressure zone for patching material ahead of the blade; a pump roll pressurizing means in said zone to act on the patching material; and mechanical, power driven means to obtain relative movement between said panel face and said doctor blade longitudinally of said panel whereby cavity defects are filled by said patching material in said pressure zone and the lower edge of said blade levels the deposited patching material substantially flush with the remainder of the panel face at the location of the blade.

References Cited in the file of this patent

UNITED STATES PATENTS

| | | |
|---|---|---|
| 711,287 | Colburn | Oct. 14, 1902 |
| 1,540,110 | Dittmar | June 2, 1925 |
| 1,897,904 | Hurxthal | Feb. 14, 1933 |
| 1,986,404 | Madge et al. | Jan. 1, 1935 |
| 2,058,369 | Taylor | Oct. 20, 1936 |
| 2,337,792 | Yokell | Dec. 28, 1943 |
| 2,354,777 | Schwartz | Aug. 1, 1944 |
| 2,810,662 | Barnebey | Oct. 22, 1957 |